United States Patent
Guo (10) Patent No.: US 8,064,165 B2
(45) Date of Patent: Nov. 22, 2011

(54) ELECTRONIC INFORMATION STORAGE APPARATUS WITH NON-LUBRICATED MEDIA

(75) Inventor: Xing-Cai Guo, Tracy, CA (US)

(73) Assignee: Hitachi Global Storage Technologies Netherland B.V., Amsterdam (NL)

( * ) Notice: Subject to any disclaimer, the term of this patent is extended or adjusted under 35 U.S.C. 154(b) by 1040 days.

(21) Appl. No.: 11/941,838

(22) Filed: Nov. 16, 2007

(65) Prior Publication Data

US 2009/0128951 A1 May 21, 2009

(51) Int. Cl.
G11B 5/82 (2006.01)
(52) U.S. Cl. ...................................................... 360/135
(58) Field of Classification Search .................. 360/133, 360/135
See application file for complete search history.

(56) References Cited

U.S. PATENT DOCUMENTS

| | | | |
|---|---|---|---|
| 5,049,410 A | 9/1991 | Johary et al. | 427/131 |
| 5,455,723 A | 10/1995 | Boutaghou et al. | 360/75 |
| 5,650,900 A | 7/1997 | Wei et al. | 360/135 |
| 6,355,300 B1 | 3/2002 | Stirniman et al. | 427/127 |
| 6,430,114 B1 | 8/2002 | Wang et al. | 369/13.38 |
| 6,521,286 B2 | 2/2003 | Isozaki | 427/130 |
| 6,656,333 B2 | 12/2003 | Lee et al. | 204/192.16 |
| 7,146,710 B2 | 12/2006 | Fong et al. | 29/603.04 |
| 7,508,632 B2 * | 3/2009 | Li et al. | 360/235.4 |
| 2005/0044696 A1 | 3/2005 | Fong et al. | 29/603.03 |

FOREIGN PATENT DOCUMENTS

| | | |
|---|---|---|
| JP | 62164206 | 7/1987 |
| JP | 63034717 | 2/1988 |
| JP | 63257916 | 10/1988 |
| JP | 1059619 | 3/1989 |
| JP | 9091652 | 4/1997 |
| JP | 10293923 | 11/1998 |
| JP | 2003173520 | 6/2003 |

OTHER PUBLICATIONS

Wang et al.; "Tribological and Recording Performance of Carbon-Coated Thin Film Head Sliders on Unlubricated and Lubricated Thin Film Media", IEEE Transactions on, Nov. 1994 Magnetics, vol. 30, No. 6, Nov. 1994, pp. 4125.
Albrecht, "Disk with Unlubricated Parking Zone", IBM Technical Disclosure Bulletin, Jun. 1985, pp. 318-319.
"Fomblin Z Derivatives; Product Data Sheet", Solvay Solexis, 2002, p. 1-3.

* cited by examiner

*Primary Examiner* — Allen Heinz
(74) *Attorney, Agent, or Firm* — Kunzler Needham Massey & Thorpe (57) ABSTRACT

Described herein are various embodiments of an electronic information storage apparatus and an associated method and system. For example, according to one illustrative embodiment, a disk drive comprises a base and at least one disk that are rotatably attached to the base. The at least one disk can include a burnished and lubricant-free outer surface. The disk drive can also include an actuator coupled to the base. The actuator can comprise a read/write head that is positionable in a reading/writing relationship with the at least one disk to define a lubricant-free space intermediate the read/write head and the outer surface. The disk drive can further include a read/write head loading and unloading ramp that is attached to the base. The ramp can include a ramp surface that is positioned proximate a periphery of the at least one disk.

12 Claims, 7 Drawing Sheets

ELECTRONIC INFORMATION STORAGE APPARATUS WITH NON-LUBRICATED MEDIA

FIELD

The present disclosure relates to electronic information storage apparatus, and more particularly to a hard disk drive with non-lubricated media, methods of making and using the same, and systems incorporating the same.

BACKGROUND

Hard disk drives ("HDDs") are widely used to store digital data or electronic information for enterprise data processing systems, computer workstations, portable computing devices, digital audio players, digital video players, and the like. Generally, HDDs store data on a disk with a surface of magnetic material. A transducer head, e.g., read/write head, includes a writing component that magnetically polarizes areas of the magnetic material with one or two polarities to encode either binary zeros or ones. Thus, data is recorded as magnetically encoded areas or bits of magnetic polarity. A transducer head also includes a reading component that detects the magnetic polarity of each bit or area and generates an electrical signal that approximates the magnetic polarity. The signal is processed to recover the binary data recorded on the magnetic material.

Figure 4:
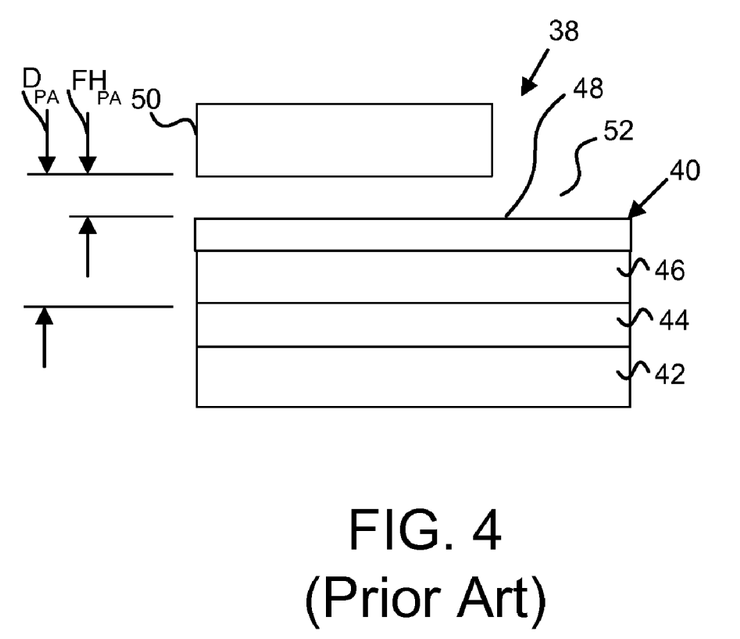
FIG. 4 is a detailed side elevation view of a conventional hard disk drive.

Referring to FIG. 4, the disk 40 of conventional HDD 38 includes a substrate layer 42, a magnetic layer 44, and a protective layer 46 defining an exterior surface 48 of the disk. The transducer head 50 moves, e.g., flies, over the exterior surface 48 of the disk 40 to perform read/write operations.

Under certain conditions during operation, the transducer head 50 may contact and cause damage to the exterior surface 48. Accordingly, in an attempt to improved flyability and durability, and to reduce damage to the exterior surface 48 of the disk 40 due to contact between the transducer head 50 and the exterior surface 48 of the disk, conventional HDDs, such as HDD 38, deposit a layer of lubricant 52 on the protective layer 46 between the protective layer 46 and the transducer head 50. Generally, the lubricant layer 52 is used to reduce friction between the transducer head 50 and exterior surface 48, as well as reduce surface wear on the exterior surface 48 if and when the transducer head contacts the exterior surface.

As the transducer head 50 moves over the disk 40, the transducer head 50 desirably is spaced-apart a predetermined distance $FH_{PA}$, i.e., flying height, relative to the disk 40 such that the transducer head does not regularly contact the disk 40. In the case of prior art HDD 38, the $FH_{PA}$ is equal to the distance between the transducer head 50 and the lubricant layer 52.

Conventionally, the lubricant of the lubricant layer 52 is a functional lubricant, such as FOMBLIN Z-DOL and Z-Tetraol. Functional lubricants include molecules with one or more functional end groups specifically designed to have a strong interaction with the disk surface, which enables each molecule to remain flat and have a good adhesion on or bond to the exterior surface 48. Further, because the functional lubricant layer 52 is used to cushion the transducer head 50 against contact with the disk 40, the lubricant must resist evaporation. Accordingly, functional lubricants typically have high molecular weight and thus low evaporation rates. For example, functional lubricants typically have molecular weights that are greater than about 2,000 g/mol and no detectable evaporation loss within about 5-10 years under normal operation temperatures, such as about 65° C.

According to some conventional manufacturing techniques, the storage disk 40 for conventional HDD 38 of FIG. 4 is made by (1) depositing a magnetic layer 44 on a substrate 42; (2) depositing a protective layer 46 on the magnetic layer 44; (3) polishing, buffing, wiping, or burnishing the protective layer; and (4) depositing a functional lubricant layer on the protective layer 52 that remains in place during operation of the HDD. In some conventional HDD manufacturing processes, the media or disk is burnished using a functional lubricant. Because functional lubricants are designed to bond with the disk, burnishing may cause damage to the disk, which can reduce the disk's resistance to corrosion.

According to another known manufacturing technique, a non-functional lubricant layer is deposited on the protective layer, and the protective layer is buffed and wiped using the non-functional lubricant. The non-functional lubricant layer is then removed from the protective layer, and a functional lubricant layer is permanently placed on the protective layer prior to operation of the conventional HDD.

Regardless of whether the first lubricant is a functional or non-functional lubricant, most conventional HDD manufacturing processes use a degreasing or cleaning procedure to remove the first lubricant used in the burnishing step. This degreasing or cleaning procedure typically requires the use of a solvent, which introduces additional tooling steps, personnel, materials, maintenance, floor area, solvent disposal problems and ultimately costs.

Although a lubricant layer between the transducer head and exterior surface of a disk may, in some instances, improve flyability and durability, and reduce friction and surface wear, the lubricant can introduce several shortcomings. For example, the efficiency and performance of HDDs are limited by the use of a lubricant layer. The distance between the transducer head and the magnetic layer is a factor in the efficiency and performance of HDDS. To increase the recording density of an HDD, the distance between the transducer head and magnetic layer must be decreased. In other words, the smaller the distance between the transducer head and the magnetic layer, the greater the ability to increase the areal or bit density of the disk, i.e., the amount of data that can be stored on the disk for a given area of the disk.

As shown in FIG. 4, the distance $D_{PA}$ between the transducer head 50 and the magnetic layer 44 of conventional HDD 38 is equal to the sum of the flying height $FH_{PA}$, thickness of the lubricant layer 52, and thickness of the protective layer 46. Because the lubricant layer 52 has a minimum physical value equal to the molecular diameter of the lubricant, the distance $D_{PA}$ cannot be smaller than the sum of the flying height $FH_{PA}$, thickness of the protective layer 46, and the molecular diameter of the lubricant without degrading the lubricant. Accordingly, one known shortcoming of using a functional lubricant layer on the protective layer is that the minimum distance between the transducer head and magnetic layer, and thus the recording or areal density, is physically limited by the physical properties, e.g., molecular weight or minimum thickness, of the lubricant.

Another known shortcoming of maintaining a functional lubricant layer between the exterior surface of the disk and the transducer head is lubricant build-up on the transducer head during normal operation of the HDD. For example, four conventional HDDs have been tested to determine the amount of lubricant build-up on the transducer head after normal operation. The lubricant build-up measured on the transducer heads was between 0.33 nm (3.3 Å) and 2.8 nm (28 Å). Lubricant build-up on the transducer head can damage the head, increase the head or glide noise, and increase the flying height of the transducer head. For example, according to tests, the increase in flying height was proportional to the increase in lubricant build-up on the transducer head. Ultimately, lubricant build-up can lead to poor performance, lower yield, and possibly failure of the HDD. Accordingly, to avoid lubricant build-up, many conventional HDDs have high flying heights.

SUMMARY

The subject matter of the present disclosure has been developed in response to the present state of the art, and in particular, in response to the problems and needs in the art that have not yet been fully solved by currently available HDDs. Accordingly, described herein are embodiments of an electronic information storage apparatus, an associated method of making and using the same, and a system that incorporates the same that overcome at least one of the above-discussed or other shortcomings in the art. For example, according to some embodiments, an electronic information storage apparatus is disclosed that, among other things, allows lower flying heights than conventional HDDs, obviates lubricant build-up on the transducer head, and does not require inefficient and costly lubricant removal processes.

According to one illustrative embodiment, a disk drive comprises a base and at least one disk that is rotatably attached to the base. The at least one disk can include a burnished and lubricant-free outer surface. The disk drive can also include an actuator coupled to the base. The actuator can comprise a read/write head that is positionable in a reading/writing relationship with the at least one disk to define a lubricant-free space intermediate the read/write head and the outer surface. The disk drive can further include a read/write head loading and unloading ramp that is attached to the base. The ramp can include a ramp surface that is positioned proximate a periphery of the at least one disk.

In some implementations, the outer surface is burnished using a non-u functional transient lubricant. In certain instances, the transient lubricant evaporates from the at least one disk without the use of solvents. In one embodiment, the transient lubricant may have a molecular weight between about 200 g/mol and about 4,000 g/mol. In more specific instances, the transient lubricant has a molecular weight between about 900 g/mol and about 2,000 g/mol.

In certain implementations, the at least one disk includes a substrate layer, a magnetic layer adjacent the substrate layer and a protective layer adjacent the magnetic layer. The protective layer may include the burnished, lubricant-free outer surface. In some instances, the lubricant-free space, e.g., flying height, may have a height between about 6 nm and about 9 nm.

According to another illustrative embodiment, an electronic computing system can comprise a storage device. The storage device can include a housing and a burnished and lubricant-free information handling medium coupled to the housing. The information handling medium can be burnished using a transient lubricant. The storage device can also include a transducer that is coupled to the housing. The transducer is also positionable over the information handling medium in a plurality of information storing and information reading positions. Additionally, the storage device includes a transducer ramp that is coupled to the housing. The ramp can be positioned adjacent the handling medium and the transducer can be positionable on the ramp in a transducer storing position. When the transducer is positioned in any of the plurality of information storing and information reading positions, a space defined between the transducer and the information handling medium is substantially free of lubrication.

In some implementations, the evaporation rate of the transient lubricant in terms of thickness is greater than about 0.01 nm (0.1 Å) per hour under ambient conditions (e.g., with ambient air at about 20° C.). In certain implementations, the evaporation rate is greater than about 0.1 nm (1.0 Å) per hour under ambient conditions. In yet some implementations, the information handling medium can include a substrate layer, a protective layer and a magnetic later intermediate the substrate and protective layers. The protective layer can include a burnished outer layer. In certain implementations, the transient lubricant removes itself from the information handling medium without the use of a solvent.

According to one embodiment, a method for manufacturing a lubricant-free magnetic recording medium for a disk drive having a transducer and a load/unload ramp can include providing a substrate and depositing a magnetic layer on the substrate. The method can also include the actions of depositing a protective layer on the magnetic layer and depositing at least one lubricant on the protective layer. Additionally, the method can include burnishing a surface of the protective layer having the lubricant. After burnishing said surface, the method can include evaporating the lubricant from the burnished surface.

In some implementations, the at least one lubricant includes a non-functional lubricant. In more specific implementations, the non-functional lubricant is selected from the group consisting of perfluoropolyether lubricants and polyphenoxytriphosphazene. The at least one lubricant can, in certain instances, includes a transient non-bonding lubricant. In some implementations, the lubricant has a molecular weight between about 900 g/mol and about 2,000 g/mol.

According to some implementations of the method, evaporating the lubricant includes exposing the lubricant to ambient air for a predetermined period of time. For example, the predetermined period of time can be at least about 70 hours.

In some implementations, depositing the at least one lubricant can include depositing a layer of the at least one lubricant where the layer has a thickness between about 0.5 nm and about 2.5 nm. Further in some implementations, evaporating the lubricant from the burnished surface can include a solvent-free process.

According to yet another embodiment, a lubricant-free magnetic recording medium for use with an electronic information storage device includes a substrate, a magnetic layer adjacent the substrate, and a protective layer adjacent the magnetic layer. The protective layer includes a burnished and lubricant-free outer surface.

Reference throughout this specification to features, advantages, or similar language does not imply that all of the features and advantages that may be realized with the electronic information storage apparatus, system and methods of the present disclosure should be or are in any single embodiment of the disclosed apparatus and methods. Rather, language referring to the features and advantages is understood to mean that a specific feature, advantage, or characteristic described in connection with an embodiment is included in at least one embodiment of the disclosed apparatus, system and methods. Thus, discussion of the features and advantages, and similar language, throughout this specification may, but do not necessarily, refer to the same embodiment.

Furthermore, the described features, advantages, and characteristics of the disclosed apparatus, system and methods may be combined in any suitable manner in one or more embodiments. One skilled in the relevant art will recognize that the apparatus, system and methods may be practiced without one or more of the specific features or advantages of a particular embodiment. In other instances, additional features and advantages may be recognized in certain embodiments that may not be present in all embodiments of the disclosed electronic information storage apparatus, system and methods.

BRIEF DESCRIPTION OF THE DRAWINGS

In order that the advantages of the disclosed apparatus, systems and methods will be readily understood, a more particular description of the apparatus, systems and methods briefly described above will be rendered by reference to specific embodiments that are illustrated in the appended drawings. Understanding that these drawings depict only exemplary embodiments of the disclosed subject matter and are not therefore to be considered to limit the scope of the subject matter, the apparatus, system and method of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the apparatus, system or method disclosed in the application. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the apparatus, systems and methods disclosed herein may be combined in any suitable manner in one or more embodiments. In the following description, numerous specific details are provided to provide a thorough understanding of embodiments of the disclosed subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of disclosed subject matter.

Figure 1:
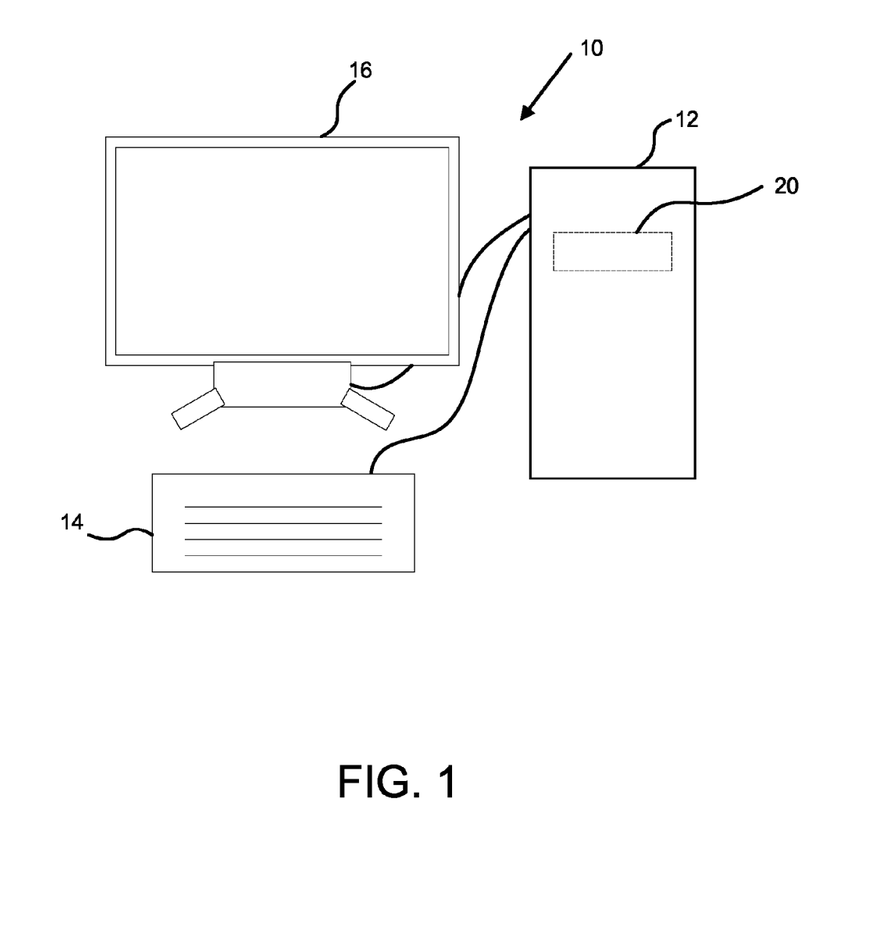
FIG. 1 is a front view of a computer system according to one embodiment that includes an electronic information storage apparatus.

As shown in FIG. 1, a computer or data processing system, such as computer system 10, can include a central processing component, such as desktop computer 12, and one or more peripheral devices, such as keyboard 14 and monitor 16, in electronic communication with the central processing component, or other processing components, such as network servers, and peripheral devices via a signal bearing medium. The desktop component 12 includes an electronic information storage device, such as hard disk drive (HDD) 20. Although the central processing component and peripheral devices of the computer system 10 are separate and distinct, in other embodiments, the central processing component and one or more peripheral devices can be integral with each other, such as with laptop, tablet, and all-in-one computer systems.

Figure 2:
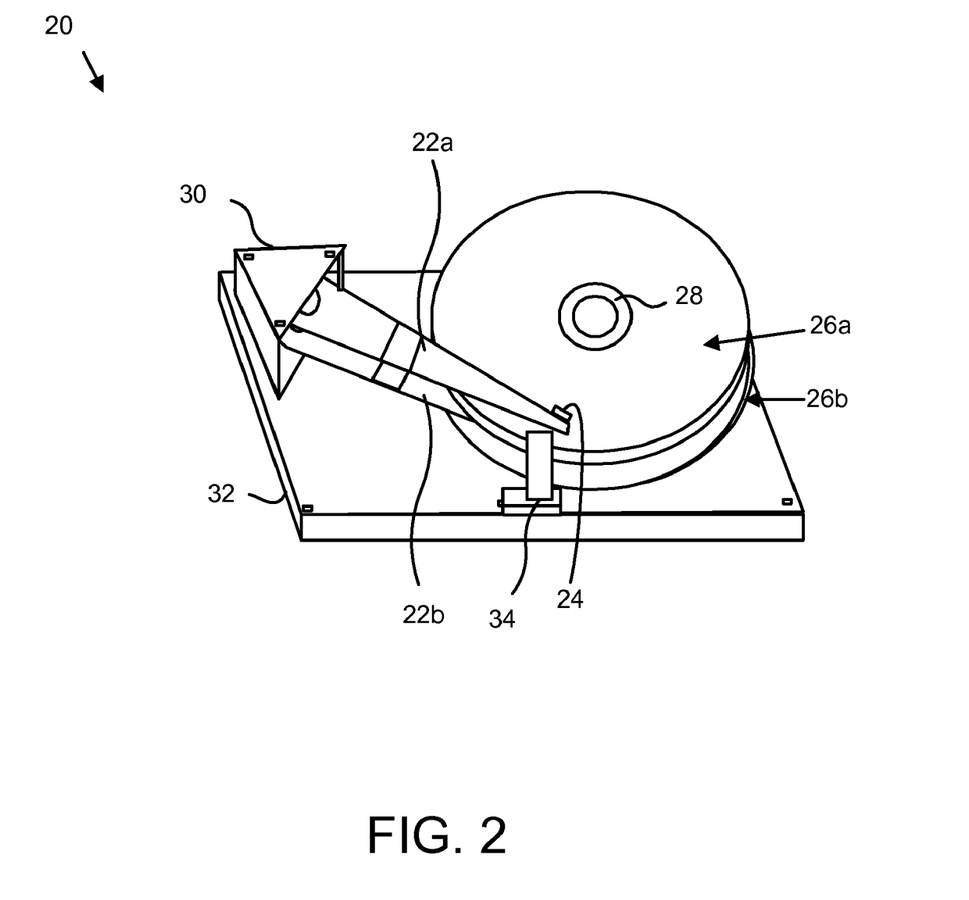
FIG. 2 is a perspective view of a hard disk drive according to an exemplary embodiment.

Referring to FIG. 2, the HDD 20 includes armatures 22a, 22b, transducer heads, such as transducer head 24, disks 26a, 26b, a spindle 28, a servo 30, a base 32, and a transducer head load/unload ramp 34. The HDD 20 can also include a cover (shown removed) that couples to the base 32 to form a housing. Each transducer head 24 is secured to an end portion of a respective armature 22a, 22b (the transducer head 24 attached to armature 22b is not shown). Although for simplicity the HDD 20 is described as having two armatures 22a, 22b, two transducer heads 24, two disks 26a, 26b, one spindle 28, and one servo 30, any number of armatures, heads, disks, spindles, and servos may be employed.

The spindle 28 is operably connected to the base 32. The disks 26a, 26b are operably connected to the spindle 28. The spindle 28 is further configured to rotate the disks 26a, 26b. The spindle 28 may be motivated by a motor as is well known to those skilled in the art. As the disks 26a, 26b rotate, the servo 30 positions the armatures 22a, 22b and the head 24 connected each armature 22a, 22b such that the heads are positioned over a specified radial area of the disks 26a, 26b.

As will be described in further detail below, each disk 26a, 26b includes a magnetic material. In some embodiments, each disk includes magnetic material on both sides of the disk such that data can be stored on both sides of the disk. Further, in these embodiments, the HDD includes transducer heads 24 each positionable over a respective side of each disk. The polarity of the magnetic material may be polarized by a magnetic field. As is known in the art, the transducer head 24 includes a write component (not shown) and a read component (not shown), which can be disposed collinearly on the head 24.

Generally, and in certain embodiments, the write component receives a write signal that encodes binary digital data and via a conductive material creates a magnetic field. In the case of transducer head 24, the spindle 28 rotates the disk 26a and the server 30 actuates the armature 22a to cooperatively position the transducer head into a writing position above a designated portion, e.g., write track, of the disk. The magnetic field polarizes the magnetic material of the disk 26a as is well known to those skilled in the art to write information to the disk. Similarly, the read component includes a thin film media that senses the magnetic field of an area of the disk and generates a read signal corresponding to the polarity of the magnetic field as is well known to those skilled in the art. Further, the spindle 28 rotates the disk 26a and the server 30 actuates the armature 22a in a manner similar to that described above in relation to the write component to position read component into a read position above a designated portion, e.g., read track, of the disk.

Similar to conventional HDDs, the transducer head 24 is configured to remain above the disk 26a during operation of the HDD 20. In other words, as the transducer head 24 writes information to and reads information from the disk, and moves between information writing and reading positions, the head is positioned a distance, e.g., flying height FH, away from the spinning disk 26a (see FIG. 5). When the HDD 20 is not in operation, the transducer head 24 is positioned in a non-operational position on the ramp 34.

Figure 3:
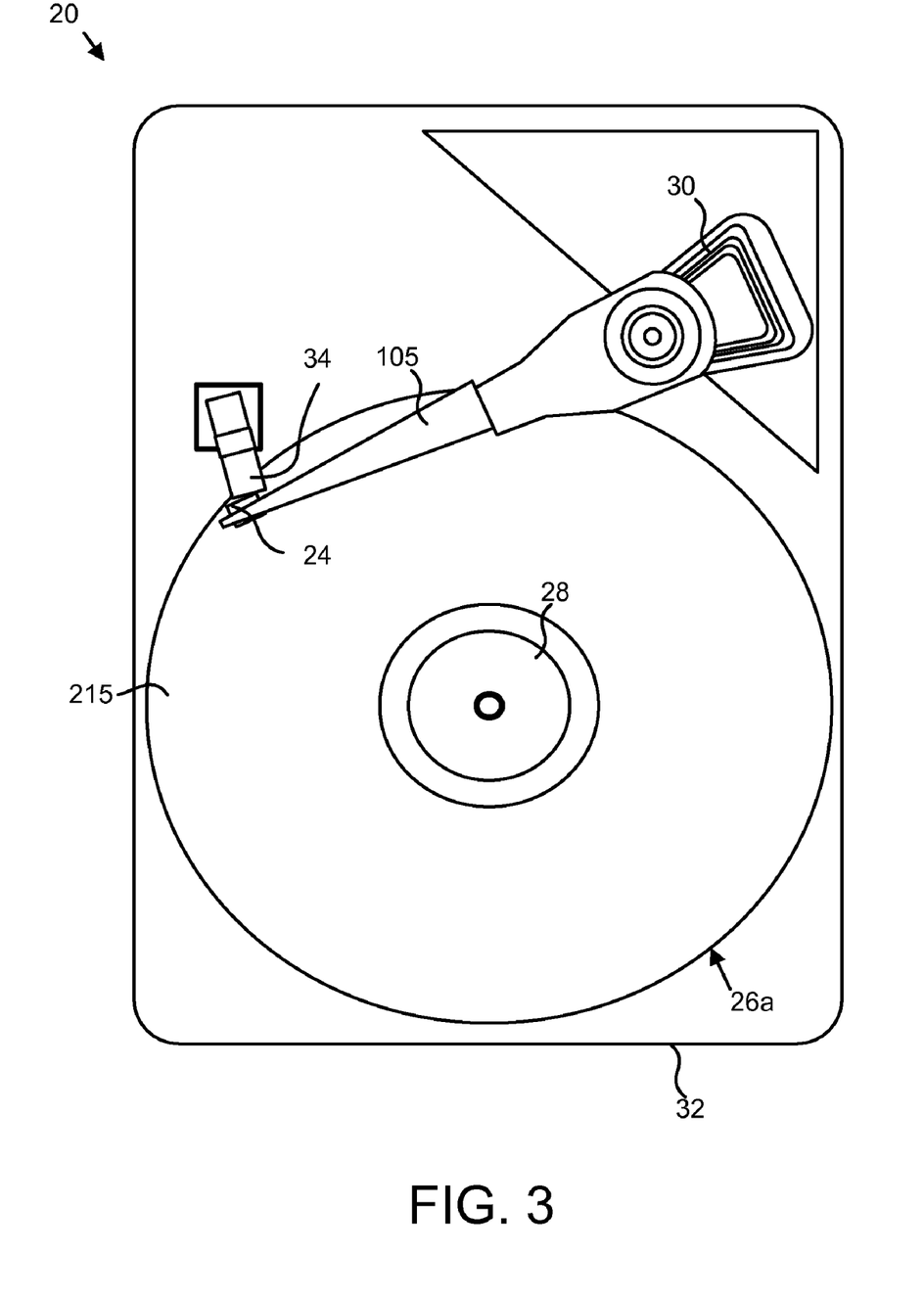
FIG. 3 is a top plan view of the hard disk drive of FIG. 2.

As with some conventional HDDs, the ramp 34 is used to facilitate unloading of the transducer head 24 from an operational position above the disk 26a to the non-operational position on the ramp, and loading of the transducer head from the non-operational position to an operation position. As shown in FIGS. 2 and 3, the ramp 34 is positioned proximate a side of the disk 26a with a portion of the ramp at least partially over the disk. The air flow or pressure maintains the transducer head 24 above the disk 26a as the transducer head reads and writes information, and moves between information reading and writing positions. When transitioning from the non-operating state to the operating state, the disk 26a spins and the armature 22a is moved to send, e.g., load, the transducer head 24 down the ramp 34. As the transducer head 24 slides past the end of the ramp 34, the air flow created by the spinning disk 26a causes the transducer head 24 to fly above the disk as discussed above. When transitioning from the operating state to the non-operating state, the disk 26a remains spinning to keep the transducer head 24 flying and the armature 22a moves the transducer head into contact with and up the ramp 34 to unload the transducer head into the non-operational position. Because of the ramp 34, the transducer head 24 is able to transition between operating and non-operating positions without contacting the exterior surface 66 of the disk 26a. Without the ramp 34, the transducer head 24 would contact and slide along the disk 26a as the HDD transitions between operation and non-operational states. Such contact is undesirable as it can result in damage to or the loss of data on the disk.

As discussed above, many conventional HDDs, such as HDD 38, employ a functional lubricant layer 52 between the transducer head 50 and the disk 40 that remains in place during operation. In contrast, the HDD 20 does not include a lubricant layer between the transducer head 24 and the disk 26a (see FIG. 5). Because the transducer head 24 remains above the disk 26a as the disk rotates underneath the transducer head, it is said that the transducer head "flies" or is "flown" at the flying height FH relative to the disk.

Figure 5:
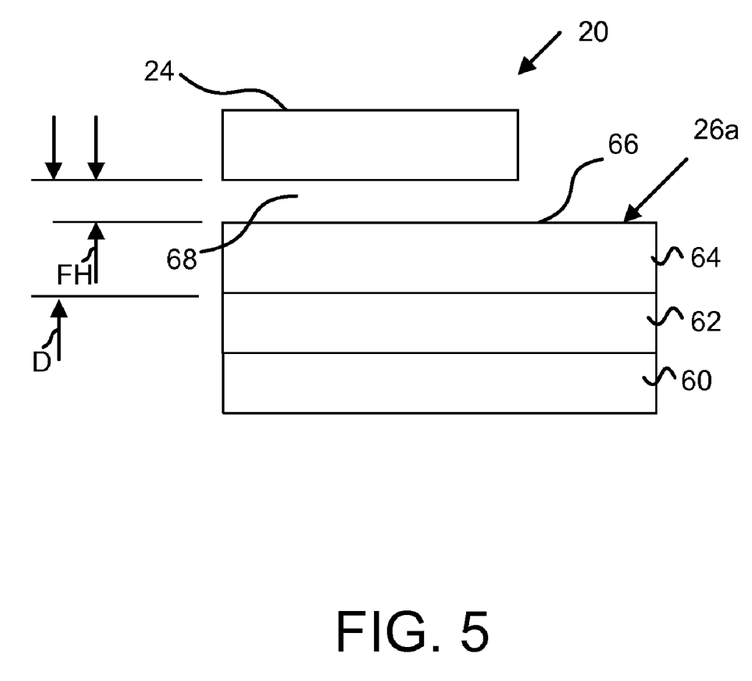
FIG. 5 is a detailed side elevation view of the hard disk drive of FIG. 2.

Similar to conventional HDD disk 40 of FIG. 4, disk 26a of HDD 20 includes a substrate layer 60, a magnetic layer 62, and a protective layer 64 defining an exterior surface 66 of the disk (see FIG. 5). The substrate layer 60 can be made from any of various suitable materials known in the art, such as, but not limited to, metal, ceramic, glass and plastic. The magnetic layer 62 can be made from any of various suitable materials known in the art, such as, but not limited to, cobalt, chromium, platinum, ruthenium, and other similar materials. The material and composition of the magnetic layer 62 can depend on the type of recording to be used, e.g., longitudinal media recording or perpendicular media recording. The protective layer 64 can be made from any of various suitable materials known in the art, such as, but not limited to, a carbon mixture, such as carbon mixed with hydrogen and/or nitrogen, silicon carbide, silicon nitride, carbon nitride and/or silicon oxynitride.

However, unlike conventional HDDs with a functional lubricant layer 52 between the transducer head 50 and exterior surface 48 of the disk 40 (see FIG. 4), HDD 20 includes a lubricant-free space 68 between the transducer head 24 and the exterior surface 66 (see FIG. 5). As defined herein, "lubricant-free" means no lubricant detectable with conventional analytical techniques. "Lubricant-free" also means no more than a nominal amount of lubricant, i.e., no more than a layer about 0.5 nm (5 Å) thick. In other words, the HDD 20 does not have more than a nominal amount of lubricant layer between the transducer head 24 and exterior surface 66. Although in some embodiments, the lubricant-free space may have up to about 0.5 nm of lubricant, in many embodiments, the lubricant-free space includes no lubricants detectable with conventional analytical techniques, such as Fourier transform infrared spectroscopy (FTIR) and Electron Spectroscopy for Chemical Analysis (ESCA). Because the HDD 20 includes a lubricant-free space 68 between the transducer head 30 and the exterior surface 66, the flying height is not limited by lubricant build-up concerns. Moreover, because the distance D between the transducer head 24 and the magnetic layer 62 is equal to the sum of the flying height FH and thickness of the protective layer only, the distance D is not limited by the physical limitations of a lubricant as with conventional HDDs.

For example, as described above, transducer heads of conventional HDDs, such transducer head 50 of the conventional HDD shown in FIG. 4, typically are configured to have a flying height $FH_{PA}$ of no less than 7 nm due to the increased likelihood of lubricant build-up on the transducer head 50. Moreover, the distance $D_{PA}$ of conventional HDDs, such as HDD 38, is limited by the thickness of the lubricant layer 52. In contrast, the lubricant-free space 68 of the HDD 20 can facilitate flying heights FH of less than 7 nm because lubricant build-up is not a concern. Accordingly, the shortcomings associated with lubricant build-up on the transducer, such as glide noise and low glide yield, are avoided. Also, the distance D of HDD 20 is less than the distance $D_{PA}$ of conventional HDD 38 because the HDD 20 does not include a lubricant layer. Therefore, the configuration of HDD 20 allows an increase in the areal density of the recording medium or disk compared to conventional HDDs. Further, because the exterior surface 66 of the disk 26a is burnished and because the HDD 20 includes a transducer head ramp 34, contact between the disk 26a and transducer head 24 is reduced. The exterior surface 66 provides protection from wear and damage to the disk in the event contact does occur.

Figure 6:
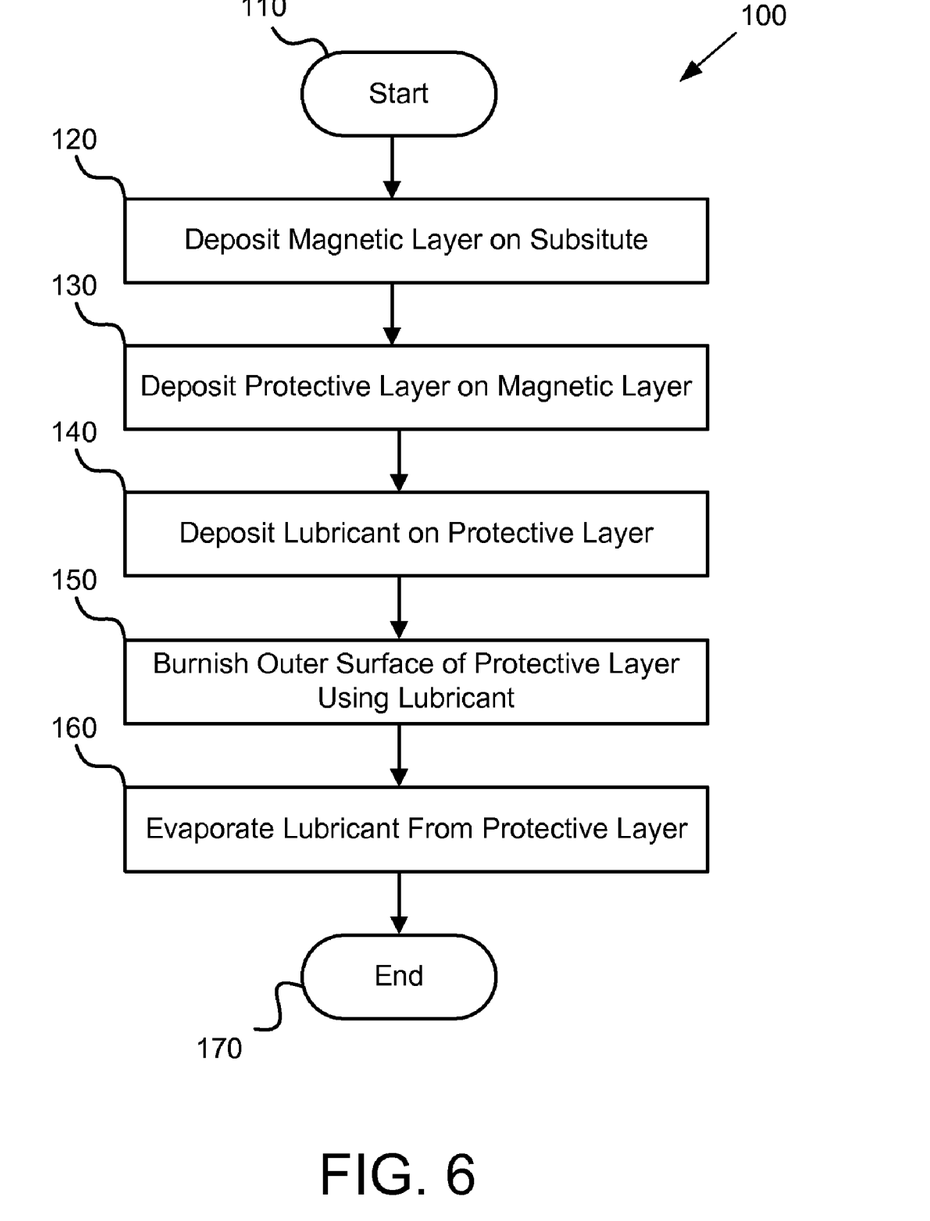
FIG. 6 is a schematic flow chart diagram of one embodiment of a method of making a recording medium for a hard disk drive.
Figure 7:
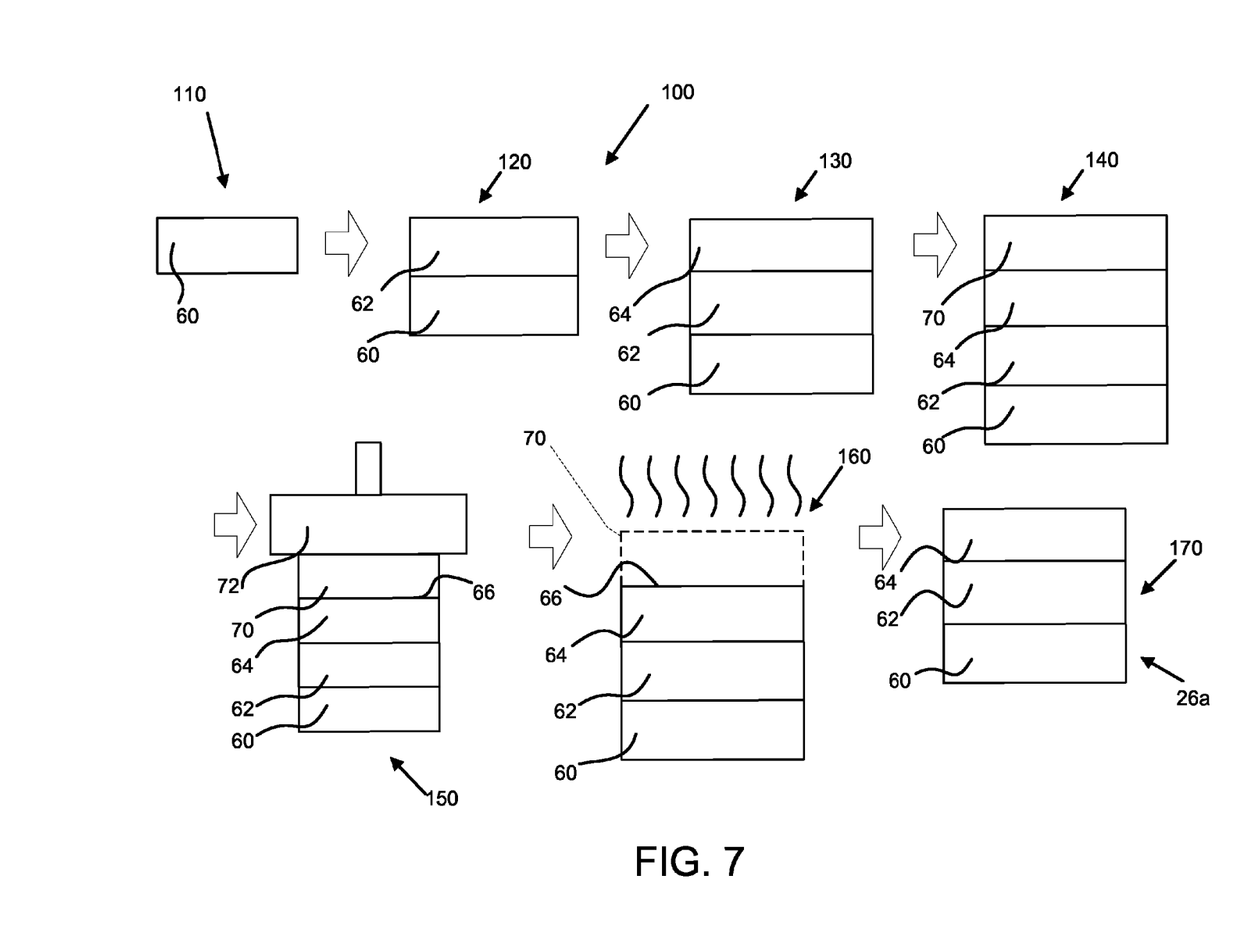
FIG. 7 is a schematic flow diagram illustrating with physical representations the method of FIG. 6.

The schematic flow diagrams of FIGS. 6 and 7 are generally set forth as a logical flow diagram. As such, the depicted order and labeled steps are indicative of one embodiment of a method of making the disk 26a of FIG. 5. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Referring to FIGS. 6 and 7, a method 100 of making the disk 26a is illustrated. The description of the method 100 refers to elements of FIG. 5, like numbers referring to like elements. The method 100 starts by providing 110 a substrate, such as substrate 60, as described above. A magnetic layer, such as magnetic layer 62, is deposited or applied 120 onto the substrate 60 using any of various deposition techniques known in the art, such as sputtering, electron-beam lithography and nanoimprint. Next, a protective layer, such as protective layer 64, is deposited or applied 130 onto the magnetic layer 62 using any of various deposition techniques known in the art, such as ion beam deposition and filtered cathodic arc deposition. A non-functional lubricant, such as lubricant 70, is then deposited or applied 140 onto the protective layer 64 by any of various techniques, such as liquid dipping and vapor deposition. In some embodiments, the layer of non-functional lubricant 70 has a thickness between about 0.5 nm (5 angstrom) and about 2.5 nm (25 angstrom).

The exterior surface of the disk, such as exterior surface 66 of disk 26a, is burnished 150 with a burnishing head having a pad and tape, such as pad 72, using the non-functional lubricant 70 as a lubricating medium. According to one implementation, the pad 72 includes an abrasive material that is pressed against the exterior surface 66 of the disk 26a as the disk is rotated. The pressure with which the pad 72 is pressed against the disk 26a is sufficiently high that the pad 72 removes asperities on the exterior surface 66. Accordingly, unlike buffing and wiping processes, which use less-abrasive pads and lighter contact pressures to remove particles or contaminants, the burnishing process removes or reduces asperities on the exterior surface 66.

Burnishing the disk 26a with a non-functional, bondless lubricant reduces damage to the disk 26a often caused by functional, bonding lubricants. Accordingly, disks 26a made according to the method described herein can be more corrosion-resistant than media made using conventional methods.

Following burnishing 150, the non-functional lubricant 70 is evaporated 160 from the disk 26a. Because the lubricant 70 evaporates from the disk 26a, the lubricant 70 is considered a transient lubricant. After the burnishing process, some lubricant remains on the exterior surface 66 of the disk 26a. In one embodiment, to promote evaporation, the disk 26a is allowed to rest in an environment under normal ambient conditions for a predetermined period of time. For example, in some instances, the disk 26a is exposed to ambient air at room temperature for at least several hours. The ambient conditions may be at least partially based on the type of non-functional lubricant used in the burnishing process. The method 100 then ends 170.

In other embodiments, the evaporation of the lubricant can be accelerated or delayed by modifying the conditions of the environment in which the lubricant is exposed. For example, in some implementations, the evaporation of the lubricant can be accelerated by increasing the temperature of the environment, such as by placing the lubricated disk in a heated oven. In some instances, the temperature of the environment is incrementally increased over time. In some implementations, in addition to, or in place of, ambient air, the environment can contain an evaporation promoting material, such as nitrogen gas or clean dry air. Additionally, evaporation of the lubricant can be promoted by convection, e.g., moving ambient or heated air, nitrogen gas, clean dry air, or other fluid, across the lubricant, by microwave radiation from a microwave oven, and/or infrared light from an infrared lamp.

Generally, a non-functional lubricant is a lubricant without a functional end group. Further, non-functional lubricants generally have a lower molecular weight, higher evaporation rate or weight loss, higher volatility, and lower tendency to bond to other surfaces than functional lubricants. Preferably, the non-functional lubricant 70 has a molecular weight less than about 4,000 g/mol and an evaporation rate greater than about 0.01 nm (0.1 Å) per hour under ambient conditions (e.g., ambient air at 20° C.), and a bonding rate such that the lubricant is capable of being rinsed off with solvent without post-treatment. In some implementations, the molecular weight of the non-functional lubricant is between about 200 g/mol and about 4,000 g/mol, and in others it is between about 900 g/mol and about 2,000 g/mol. For example, in some embodiments, the non-functional lubricant 70 can be a type of perfluoropolyether and/or polyphenoxytriphosphazene lubricant. Further, in certain instances, the lubricant can be fractionated to narrow the molecular weight distribution of the lubricant.

In certain embodiments, the non-functional lubricant 70 is Fomblin Z®, which has the following molecular structure:

$$F_3CO-(CF_2CF_2O)_m-(CF_2O)_n-CF_3 \tag{1}$$

More specifically, the non-functional lubricant 70 can be fractionated from Fomblin Z Z02®.

In certain embodiments, the non-functional lubricant 70 is Fomblin Y®, which has the following molecular structure:

(2)

More specifically, the non-functional lubricant 70 can be Fomblin Y Y04® or Fomblin Y Y06®.

In certain embodiments, the non-functional lubricant 70 is Demnum®, which has the following molecular structure:

$$F-(CF_2CF_2CF_2O)_n-CF_3 \tag{3}$$

In yet certain embodiments, the non-functional lubricant 70 is Krytox®, which has the following molecular structure:

$$F-(CF(CF_3)CF_2O)_n-CF_2CF_3 \tag{4}$$

Although specific examples of possible non-functional lubricants are described above, in some embodiments, other lubricants having physical properties and characteristics similar to those described above can be used. Moreover, although in the above exemplary embodiments, the non-functional lubricant 70 is comprised solely of a lubricant having a single molecular structure, in other embodiments, the non-functional lubricant can be a mixture of two or more of the above-described or other similar non-functional lubricants having associated molecular structures. For example, the lubricant 70 can be a mixture of two or more of Fomblin Z, Fomblin Y, Demnum and Krytox.

Figure 8:
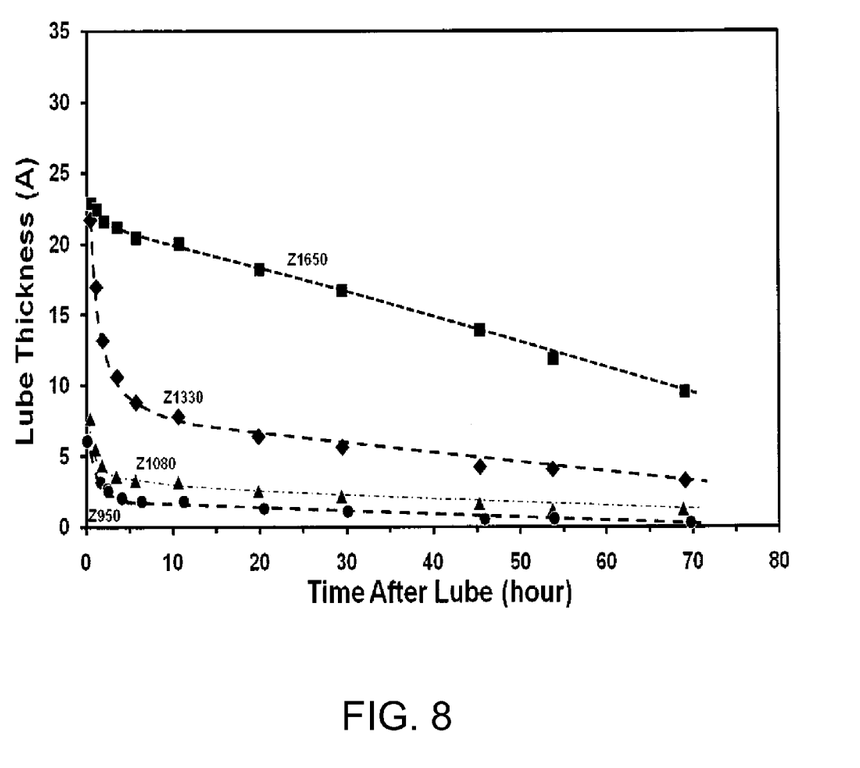
FIG. 8 is a graph illustrating lubricant thickness on information storage media over time.

The evaporation of non-functional lubricants from the exterior surface of a disk after burnishing the disk has been tested. For example, the reduction in thickness of four lubricants over time due to evaporation is shown in FIG. 8. The lubricants tested comprised a Fomblin Z lubricants fractionated differently such that each lubricant had one of four different molecular weights, i.e., 1650, 1330, 1080 and 950 g/mol. As shown, non-functional lubricants with relatively lower molecular weights, such as 950, 1080 and 1330 g/mol, evaporated more quickly than non-functional lubricants with relatively higher molecular weights, such as 1650 g/mol.

Accordingly, the evaporation rate can be modified by varying the molecular weight of the lubricant. Depending on the process time for a particular HDD, e.g., the time between application of the lubrication to the disk and operation of the HDD, a non-functional lubricant having an appropriate molecular weight for ensuring proper evaporation of the lubricant before use can be selected. For example, if an HDD is being manufactured for immediate use upon final assembly, a lubricant having a lower molecular weight and faster evaporation rate, e.g., Z950, can be used to burnish the disk. In contrast, a lubricant having a higher molecular weight and slower evaporation rate, e.g., Z1650, can be used for HDDs that are not used or assembled for at least several days.

Using evaporation to remove the lubricant from the disk 26a before use of the HDD provides several advantages over conventional processes. As described above, in conventional lubricant removal processes, the lubricant is removed using degreasers or solvents, thus introducing additional tooling steps, personnel, solvents, maintenance, floor area, and ultimately costs. Removing the non-functional lubricant through evaporation techniques virtually eliminates the above shortcomings associated with conventional lubricant removal process.

HDDs manufactured using the above-described manufacturing techniques of the present subject matter have been tested. For example, a HDD with a burnished, non-lubricated outer surface was tested to determine the durability of HDDs with non-lubricated media. The HDDs were subject to a sub-ambient flyability test at a transducer head touch down pressure, e.g., about 55 kPa. The time-to-failure (TTF) of the HDD, i.e., the time from the transducer head touching the disk surface due to the pressure decrease to the ultimate failure of the HDD, was determined to be about 1,355 minutes.

In another example, six non-lubricated outer surfaces had been tested to determine the effect of burnishing or not burnishing the outer surface on the TTF. The three unburnished, non-lubricated disks each had a TTF of less than about 10 minutes, and the three burnished, non-lubricated disks (burnished using Z1330 non-functional lubricant) each had a TTF of greater than about 1,355 minutes.

The subject matter of the present application may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A disk drive comprising:
   a base;
   at least one disk rotatably attached to the base, the at least one disk comprising a burnished outer surface, wherein substantially no lubricant is detectable on the outer surface of the disk, and wherein no functional lubricant is applied to the burnished outer surface of the at least one disk;
   an actuator coupled to the base and comprising a read/write head positionable in a reading/writing relationship with the at least one disk to define a space having substantially no lubricant intermediate the read/write head and the outer surface; and
   a read/write head loading and unloading ramp attached to the base, wherein the ramp comprises a ramp surface positioned proximate a periphery of the at least one disk.

2. The disk drive of claim 1, wherein the outer surface is burnished using a transient lubricant.

3. The disk drive of claim 2, wherein the transient lubricant evaporates from the at least one disk without the use of solvents.

4. The disk drive of claim 2, wherein the transient lubricant has a molecular weight between about 200 g/mol and about 4,000 g/mol.

5. The disk drive of claim 4, wherein the transient lubricant has a molecular weight between about 900 g/mol and about 2,000 g/mol.

6. The disk drive of claim 1, wherein the at least one disk comprises a substrate layer, a magnetic later adjacent the substrate layer and a protective layer adjacent the magnetic layer, and wherein the protective layer comprises the burnished outer surface.

7. The disk drive of claim 1, wherein the space intermediate the read/write head and the outer surface has a height between about 6 nm and about 9 nm.

8. An electronic computing system comprising:
   a storage device comprising:
   a housing;
   a burnished and lubricant-free information handling medium coupled to the housing, wherein the information handling medium is burnished using a transient lubricant, wherein no non-transient lubricant is applied to the burnished information handling medium;
   a transducer coupled to the housing and positionable over the information handling medium in a plurality of information storing and information reading positions; and
   a transducer loading and unloading ramp coupled to the housing and positioned adjacent the handling medium, wherein the transducer is positionable on the ramp in a transducer storing position;
   wherein in any of the plurality of information storing and information reading positions, a space defined between the transducer and the information handling medium is substantially free of lubrication and wherein in any of the plurality of information storing and information reading positions, a distance between the transducer and the information handling medium is less than about 7 nm.

9. The electronic computing device of claim 8, wherein the transient lubricant has an evaporation rate of greater than about 0.01 nm per hour under ambient conditions.

10. The electronic computing device of claim 8, wherein the information handling medium comprises a substrate layer, a protective layer and a magnetic later intermediate the substrate and protective layers, and wherein the protective layer comprises a burnished outer layer.

11. The electronic computing device of claim 8, wherein the transient lubricant removes itself from the information handling medium without the use of a solvent.

12. A magnetic recording medium for use with an electronic information storage device, comprising:
    a substrate;
    a magnetic layer adjacent the substrate; and
    a protective layer adjacent the magnetic layer;
    wherein the protective layer comprises a burnished outer surface having substantially no lubricant, and wherein no lubricant is applied to the burnished outer surface of the protective layer following burnishing of the outer surface.

* * * * *